United States Patent [19]

Sampson

[11] Patent Number: 5,013,566
[45] Date of Patent: May 7, 1991

[54] PROCESS FOR OBTAINING IMPROVED YIELDS FROM PLANTS USED FOR HAY MAKING BY USING A COATING AGENT

[76] Inventor: Michael J. Sampson, 18 Christchurch Road, Norwich Norfolk, England, NR2 2AE

[21] Appl. No.: 286,322

[22] Filed: Dec. 19, 1988

[51] Int. Cl.$^5$ .............................................. A23K 1/00
[52] U.S. Cl. .................................. 426/302; 426/310; 426/335; 426/532; 426/518; 426/636; 426/650; 426/807
[58] Field of Search ............... 426/636, 310, 302, 807, 426/335, 532, 650, 518

[56] References Cited

U.S. PATENT DOCUMENTS 4,540,586 9/1985 Moore .................................. 426/310
4,559,235 12/1985 Miller .................................. 426/636

FOREIGN PATENT DOCUMENTS 2063235 6/1981 United Kingdom ................ 426/636

*Primary Examiner*—R. B. Penland
*Attorney, Agent, or Firm*—Renner, Otto, Boisselle & Sklar

[57] ABSTRACT

Alfalfa, grass and other hay crops are sprayed with a coating agent such as a terpene to prevent leaf-shedding during drying or harvesting.

7 Claims, 1 Drawing Sheet

PROCESS FOR OBTAINING IMPROVED YIELDS FROM PLANTS USED FOR HAY MAKING BY USING A COATING AGENT

FIELD OF THE INVENTION

This invention relates to the production of hay, which is a dried plant material, primarily for use as an animal feeding stuff.

DESCRIPTION OF THE PRIOR ART

Hay is prepared from crops such as grass, alfalfa, clover and Birdsfoot Trefoil but it may deteriorate as the result of their leaves being shed during the drying process or at the time of baling or other form of harvesting. This may be particularly marked where rainfall or dew wets the drying hay crop after it has been cut or swathed. Leaf loss may be both by shedding of the complete leaf at the leaf stalk or by breaking of the leaf as it becomes brittle or drying.

A technique described in UK Patent GB No. 2 063 235 B prevents shatter or splitting in pod-bearing crops such as peas, beans and oilseed rape.

BRIEF SUMMARY OF THE INVENTION

The technique of the said UK patent is advantageously applied to hay to reduce its tendency to deteriorate by leaf loss and thus improve the quality and yield of the hay. The technique involves applying a coating material that acts as a unidirectionally permeable membrane allowing water to be lost but not substantially reabsorbed. Such materials include a group of pinolene products based on di-1-p-menthene under a variety of trade names including Miller Aide, Miller Gard, Nu-Film P, Nu-Film 17 and Vapor Gard. These products, which contain di-1-p-methene and certain of its polymers, further polymerize to form a film, and such further polymerization may take place or even be induced before application. Other monoterpenes of formula $C_{10}H_{16}$, which correspond to two isoprene units, can also be used.

In particular, a method for hay making is described, which comprises:
cutting or swathing at least one plant suitable for hay making and applying a coating material to the plant before, during or shortly after the cutting or swathing.

DETAILED DESCRIPTION OF THE INVENTION

Figure 1:

Pinolenes are naturally occurring substances and are both expensive and in short supply in relation to possible agricultural needs. It is therefore useful to extend them by using them in combination with other coating agents. Such compounds or mixtures of coating agents (which may be polymerized before application) can show properties unlike those of their individual components. The mixtures contain from 2 to 10 coating agents, one or more of which is preferably a pinolene compound although mixtures without such compounds may be used.

Apart from the monoterpenes mentioned, the following compounds are suitable, though this is not an exhaustive list:

1. Terpene hydrocarbons of the elementary composition $C_{15}H_{24}$ (sesquiterpenes)
2. Terpene hydrocarbons of the elementary composition $C_{20}H_{32}$ (diterpenes)
3. Terpene hydrocarbons of the elementary composition $C_{30}H_{48}$ (triterpenes)
4. Terpenes having 40 carbon atoms (tetraterpenes)
5. Bicyclic and tricyclic monoterpenes and their derivatives (e.g. oxygenated derivatives) such as alpha and beta pinene, d-camphor, d-borneol, d-tanacetone, beta-thujone, d-delta$^3$-carene
6. Terpene resins (compounded with or without natural or synthetic rubbers)
7. Gum turpentine
8. Sulphate of turpentine
9. Wood turpentine
10. Pineoils
11. Terpineols
12. Alkyd Resins, non-oxidizing—e.g. those of the castor oil, coconut oil, hydrogenated caster oil, lauric acid, oil-free, saturated acid and synthetic fatty acid types
13. Alkyd Resins, Oxidizing—e.g. acrylic-resin-modified, dehydrated castor oil types, epoxide-resin-modified, isophthalic-acid-based types, linoleic-rich oil type, linseed oil types, linseed oil/dehydrated castor oil types, linseed oil/soya bean oil types, linseed oil/tung oil types, maleic-resin-modified, marine oil types, phenolic-resin-modified, rosin-modified, safflower seed oil types, silicone-resin-modified, soya bean oil types, soya bean oil/tung oil types, styrenated types, sunflowerseed oil types, tall oil types, tobaccoseed oil types, unmodified types, vinyltoluene-modified and water-souble types
14. Benzoguanamine resins
15. Styrene polymers and copolymers, e.g. polystyrene and styrene/maleic anhydride and butadiene/styrene copolymer resins
16. Carbamide resins
17. Copal ester resins
18. Coumarone-indene resins
19. Cresylic resins
20. Epoxy resins—e.g. dehydrated castor oil types, linseed oil types, linseed oil/rosin types, phenolic-resin-modified, soya bean oil types, styrenated types, vinyltoluene-modified, unmodified types, Epikote 828 and Epikote 1001
21. Epoxide melamine condensates
22. Epoxide phenolic condensates
23. Ester gums
24. Fumaric resins
25. Furan resins
26. Ketone resins
27. Maleic resins
28. Melamine resins—e.g. butylated types, hexamethoxy-methyl types and formaldehyde condensates
29. Metallic rosinates—e.g. clacium or zinc resinates, zinc/calcium mixtures both rosin or modified rosin
30. Phenolic resins and modified phenolic resins—e.g. phenol/aldehyde resole condensates adducted to rosin or modified rosin, as well as phenol/formaldehyde resins
31. Phenoxy resins
32. Polybutadiene resins
33. Polybutene resins
34. Polycarbonate resins
35. Polyisobutylene resins
36. Polyester resins—e.g. polyacrylate and polymethacrylate ester resins
37. Polysulphide resins 38. Polyurethane resins—e.g. modified types and oil-modified types
39. Polyvinyl acetal resins
40. Polyether resins—e.g. polyvinyl ether resins
41. Polyvinyl formal resins
42. Rosin derivatives—e.g. esters of rosin, copal, rosin acids or rosin modified by hydrogenation, polymerization, isomerization or disproportionation with glycerol, pentaerythritol or other polyhydric alcohols
43. Maleic/fumaric condensate resins—e.g. maleic or fumaric acid/anhydride adducts on rosin or modified rosins, their esters with glycerol, pentaerythritol or other polyhydric alcohols
44. Silicone resins and polymers
45. Urea resins—e.g. urea-formaldehyde
46. Xylene-formaldehyde resins
47. Natural gums/resins—e.g. accoroides, arabic, benzoin, copals, damar, elemi, gamboge, karaya, mastic, rosin, sandarac, shellac and tragacanth
48. Acrylic polymers and copolymers—e.g. polyacrylic acid, polyacrylamide, polyacrylonitirile, poly(methyl methacrylate) and poly(ethylacrylate/butyl acrylate)
49. Cellulose ethers—e.g. hydroxyethyl cellulose and sodium carboxymethyl cellulose
50. Cellulose esters—e.g. methyl cellulose
51. Hyrocarbon resins—e.g. petroleum resins
52. Polyamide resins
53. Rubbers—e.g. natural rubber, butyl rubber, nitrile rubber, polychloroprene, rubber/oil emuline and polyurethane rubber and cyclized rubber resins
54. Vinyl polymers and copolymers other than those already mentioned—e.g. poly(vinyl acetate), poly(vinyl alcohol), poly(vinyl butyral), poly(vinyl pyrrolidone), poly(vinyl acetate/vinyl chloride) and poly(vinyl acetate/acrylate) and
55. Natural drying oils—e.g. linseed oil and tung oil and mixtures of them.

Terpenes are preferred, with di-1-p-membrane and its polymers especially preferred. The said coating materials may be applied to a crop destined for use as hay up to 14 days before cutting or swathing. However, plant growth made after application will not be protected so that it is desirable to spray within a few days before swathing or cutting preferably within 4 days. The coating materials may be applied immediately before cutting or swathing using a sprayer mounted to the swathing machine. Alternatively the spraying may be carried out during the swathing or cutting process or immediately after. Once the crop has been laid in the swath the technique is less satisfactory as it becomes difficult to treat the lower levels of the swathed crop. However, the outside of the swath is that most likely to suffer as the result of rain or dew. Applying the coating material after swathing is for this reason within the scope of the present invention. However, once the crop is significantly wilted or dried treatment will become considerably less effective. Many hay crops are treated with either a chemical preservative, such as one based on propionic acid, or a microbiological treatment aimed to create a more palatable and nutritious animal food. The application of the said coating materials may be carried out in conjunction with such materials.

In addition, flavouring or flavour enhancers may be applied in conjunction with the coating materials.

As mentioned, di-1-p-menthene and its polymers are particularly useful for this purpose. They may be used in conjunction with a surfactant such as an alkyl phenol ethylene oxide condensate.

Suitable coating formulations may contain from 10% to 98% of the said coating materials such as di-1-p-menthene and polymers with from 1% to 30% of a surfactant or wetting agent or mixture of these. Water may be added as a diluent in forming a satisfactory emulsion.

The rates of application will vary with the estimated weight of the hay crop. The application rate of the coating material in the formulation should be between 0.03 liter per tonne of crop to 0.5 liter per tonne of crop.

A crop of alfalfa estimated to yield 25 tonnes per hectare would thus receive 0.75-12.5 liters of the said coating material per hectare.

The material may be sprayed from the ground or the air. Suitable application rates would be from 25 to 75 liters per hectare by air or from 40 to 600 liters per hectare by ground.

Where appropriate, the formulation containing the coating may be used in tank mixture with a desiccant, the application of the coating may precede or application of a desiccant within a period in which the desiccant has not significantly affected the crop. Suitable desiccants include diquat and endothal.

EXAMPLE

Figure 2:
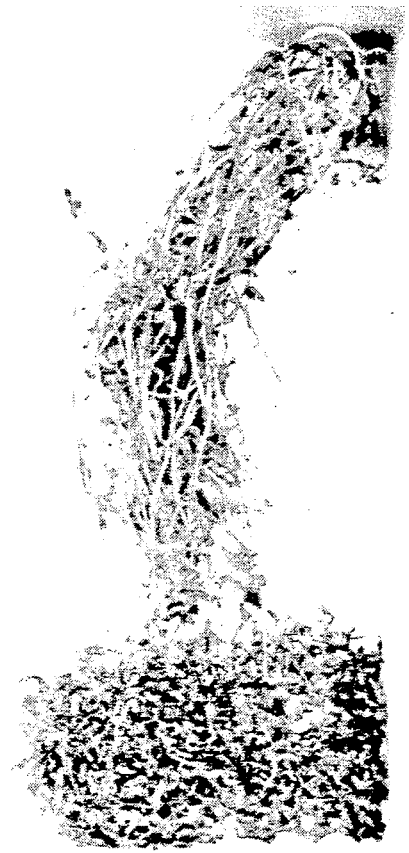

Alfalfa plants were sprayed with Spodnam, a 1-p-menthene coating material. Unsprayed but otherwise identically treated plants were used as a control. The plants were cut and dried in bunches of equal weight. Dry bunches were placed separately in containers and these placed together and shaken. The % of material (mainly leaf) detached from the stem bundle after shaking was measured by weight. In the sparayed plants, one of which, together with the detached material, is shown in FIG. 1 of the drawings, 8.6% by weight of material was removed; in the unsprayed plants, one of which, together with the detached material, is shown in FIG. 2, 30.8% by weight of material was removed.

I claim:

1. A method for hay making, which comprises:
   cutting or swathing a plant crop suitable for hay making selected from the group consisting of grass, alfalfa, clover or Birdsfoot Trefoil and
   applying a coating material comprising di-1-p-menthene or polymers of di-1-p-menthene to said crop before or during the cutting or swathing, wherein the coating material is applied by spraying said crop with a formulation containing the coating material and from 1 to 30% of a surfactant or wetting agent wherein said formulation is applied in an amount of 0.03 to 0.5 liter of coating material per ton of said crop and wherein said coating material reduces leaf shedding during drying or harvesting.

2. A method according to claim 1 wherein the coating material is applied together with a chemical or microbiological hay preservative or with a hay flavoring or hay flavor enhancer.

3. A method according to claim 1 wherein a desiccant is applied together with the coating material.

4. A method according to claim 3 in which the desiccant is diquat or endothal.

5. A method according to claim 1 wherein the step of applying the coating material is conducted up to about 14 days before the cutting or swathing step.

6. A method according to claim 1 wherein the step of applying the coating material is conducted contemporaneously with the cutting or swathing step.

7. A method according to claim 1 wherein the coating material is applied by spraying said crop with a formulation containing from about 10 to about 98 percent of the coating material.

* * * * *